United States Patent [19]
Luke

[11] Patent Number: 6,021,787
[45] Date of Patent: Feb. 8, 2000

[54] METHOD FOR CLEANING VESSELS DURING SERVICE

[75] Inventor: Robert P. Luke, Lafayette, La.

[73] Assignee: Production Management Industries, Inc., Harvey, La.

[21] Appl. No.: 09/037,672

[22] Filed: Mar. 10, 1998

[51] Int. Cl.[7] ...................................................... B08B 9/00
[52] U.S. Cl. ...................... 134/22.1; 134/22.18; 134/24; 134/168 R; 134/169 R
[58] Field of Search ................................ 134/22.1, 22.18, 134/24, 169 R, 168 R, 167 R, 166 R

[56] References Cited

U.S. PATENT DOCUMENTS

| | | | |
|---|---|---|---|
| 3,719,191 | 3/1973 | Zimmerly | 134/102 |
| 3,953,226 | 4/1976 | Emond et al. | 134/104 |
| 4,770,711 | 9/1988 | Deal, III et al. | 134/18 |
| 5,091,016 | 2/1992 | Krajicek et al. | 134/22.1 |
| 5,582,652 | 12/1996 | Robertson et al. | 134/22.12 |
| 5,740,821 | 4/1998 | Arnold | 134/113 |

*Primary Examiner*—Randy Gulakowski
*Assistant Examiner*—Saeed Chaudhry

[57] ABSTRACT

An improved system for removing solids such as sand from hydrocarbon liquid and water separation vessels. A nozzle discharges a fluid stream for displacing the solids within the vessel interior through a valve or exit port. The nozzle can be manipulated to selectively control the fluid stream discharge placement. A controller positions the nozzle below the vessel to clear a port and valve above the nozzle. The controller can also position the nozzle within the vessel interior and can control the placement of the nozzle liquid discharge stream. This directional control efficiently directs the solids toward a discharge port and reduces inadvertent movement of the solids into oil buckets and other defined spaces within the vessel.

5 Claims, 2 Drawing Sheets

METHOD FOR CLEANING VESSELS DURING SERVICE

BACKGROUND OF THE INVENTION

The present invention relates to the field of production fluid vessels for separating sand and other solid materials from water and other hydrocarbon fluids produced from a well. More particularly, the present invention relates to an improved system for removing solid materials from a separator vessel while the vessel is in-service.

Bulk separator vessels remove sand and other solid materials from fluids produced from hydrocarbon wells. Sand is often produced from unconsolidated production zones within an oil and gas well. Because sand is highly abrasive and also tends to pack-off flow constrictions, sand removal extends equipment life and reduces maintenance requirements.

One type of bulk separator operates on the principles that sand is more dense than the hydrocarbon fluids, that oil and other hydrocarbon liquids are less dense than water produced with the hydrocarbons, and that these materials tend to separate over time. The well fluids are deposited into a large separator vessel and the sand settles to the vessel bottom. Water also collects in the vessel bottom and rises to a selected mid point level having an exit weir which screens sand movement while permitting excess water to be diverted to an exit nozzle. An "oil bucket" has an intake at a higher elevation than the water exit weir, and collects oil and other hydrocarbons floating near the top of the water. An oil bucket exit nozzle discharges oil and other hydrocarbons from the vessel interior.

The separator vessel permits relatively crude separation of sand, water and oil on a continuous basis. While the water and oil are continuously discharged from the vessel interior, sand accumulates in the vessel bottom until the system is closed down for cleaning. After system operations are discontinued, the vessel is opened and sand is typically discharged from the vessel interior by hydrojetting operations. Previously, the equipment was manually operated by maintenance personnel. This contact with potentially toxic hydrocarbon fluid residue in the vessel interiors requires ventilation, atmospheric monitoring of the vessel site, and personnel safety training and management.

Conventional vessel cleaning also closed down hydrocarbon production during the turnaround time necessary to clean the separator vessel. Lost production is highly expensive and reduces operating productivity. Various techniques have been developed to provide in-service separator vessel cleaning services. One technique pushes a lance and nozzle into the vessel interior. The lance is manually pushed through a packer seal to prevent uncontrolled leakage of fluids from the vessel interior. In an improved system, a hydraulic ram pushes the lance nozzle into the vessel interior. The lance is pushed through the packer seal until the nozzle extends into the vessel interior. Compressed air or a pressurized fluid is then pumped through the lance body and nozzle tip so that the force generated by the nozzle discharge dislodges solid materials within the vessel interior. The dislodged solid materials are withdrawn through an exit port or valve.

Although this technique provides for solids removal without disrupting separation operations, this process is inefficient for several reasons. Because the lance body must be sufficiently flexible to pass through conduit and into the vessel interior, force exerted on the lance body within the vessel interior by the nozzle discharge causes the lance body to whip around in the vessel interior. This uncontrolled movement can damage the lance body, nozzle tip, and interior vessel components, and can leave uncleaned areas within the vessel as the lance moves indiscriminately within the vessel.

This technique creates another significant problem in conventional cleaning operations. The nozzle indiscriminately stirs up solid materials within the vessel interior and re-mixes the solid materials with the water and hydrocarbon fluids. By reversing the settling processes provided by the separator vessel, sand and other solid materials are suspended in the water and hydrocarbon fluids and can re-enter the oil bucket and water collection areas within the vessel. After the sand has entered such areas, the sand will travel downstream with the hydrocarbons and water streams or will pack-off within the oil bucket and water collection areas.

Accordingly, a need exists for an improved separation system that provides inservice cleaning of separator vessels. The system should not disrupt separation operations, should efficiently remove sand and other solid materials from the vessel, and should limit maintenance personnel exposure to hazardous materials.

SUMMARY OF THE INVENTION

The present invention discloses a system for cleaning solid material from a vessel having a port and a hollow interior. The invention comprises a conduit attachable to the port for selectively permitting entry through the port to the vessel interior. A nozzle discharges a pressurized fluid stream to displace the solid material within the vessel interior, and a control means selectively positions the nozzle to control the path of the pressurized fluid stream and to displace the solid material so that the solid material is capable of exiting the vessel interior.

In different embodiments of the invention, the control means can position the nozzle at an elevation below the vessel interior, and the control means can position the nozzle within the vessel interior as the direction of the pressurized fluid stream is controlled. A second port can permit the exit of solid material from the vessel interior, and a pump can be engaged with the second port to draw solid material through the second port. The control means can monitor the exit rate of solid material from the vessel interior, and can selectively position the nozzle in response to variations in the solid material exit rate.

The method of the invention is practiced by placing a nozzle in communication with a valve engaged with the vessel, by opening the valve to place the nozzle in communication with the vessel interior, by discharging a pressurized fluid stream through the nozzle to displace the solid material, by controlling the placement of the pressurized fluid stream, and by withdrawing solid material from the vessel interior through the valve.

DESCRIPTION OF THE PREFERRED EMBODIMENTS

Figure 1:
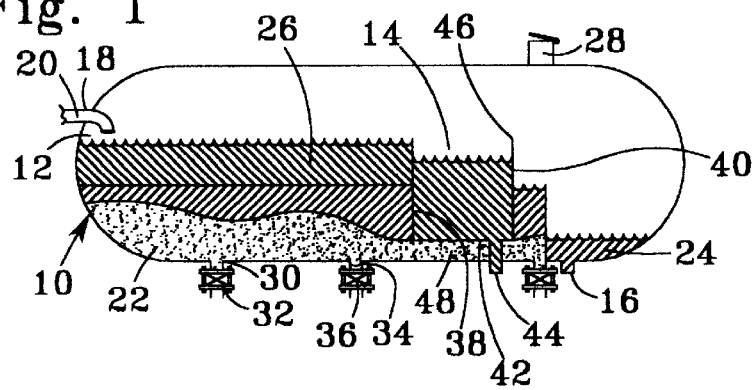
FIG. 1 illustrates a bulk vessel containing oil, water and a solid material such as sand.

The invention provides an improved system for in-service cleaning of vessels. FIG. 1 illustrates conventional bulk separator vessel 10 having hollow interior chamber 12, oil bucket 14, and water discharge 16. Intake port 18 introduces well fluids 20 into interior chamber 12, and well fluids 20 separate through gravitational and other separation processes into sand and other solid materials 22, water 24, and oil and other hydrocarbon liquids 26. Vent 28 permits the controlled discharge of gases from interior chamber 12. Vessel chamber 12 includes port 30 closed with valve 32, and port 34 closed with valve 36. Oil bucket 14 has barrier wall 38 and wall 40 for defining oil containment chamber 42 and for preventing oil 26 from entering water discharge 16. Discharge port 44 permits controlled removal of oil 26 from oil containment chamber 42. Weir 46 isolates water discharge 16 by preventing sand 22 from entering water discharge 16, and channel 48 under oil bucket 14 permits water migration to weir 46 while preventing oil 26 migration over weir 46.

As used herein, the term "vessel" comprises any container suitable for containing the fluids. The terms "sand" or "solid material" comprise any compound, component or material which is separable from a fluid such as a liquid. Although the following description refers to the separation of sand from water and hydrocarbon fluids such as oil, the invention is applicable to containers and vessels containing other, different materials.

Figure 2:
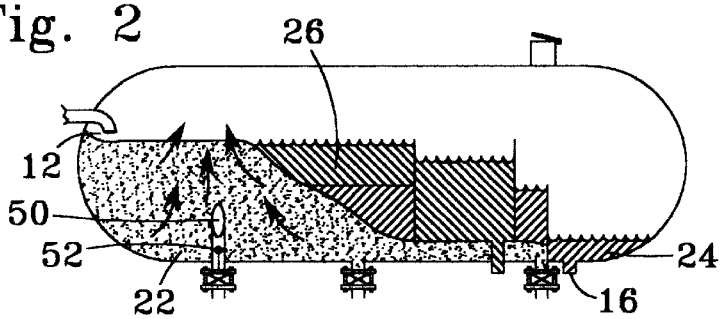
FIG. 2 illustrates a technique for vessel cleaning known in the art.

As illustrated in FIG. 1, sand 22 has filled the bottom of vessel chamber 12 in an irregular distribution and has closed channel 48 under oil bucket 14. Referring to FIG. 2 as a prior art reference, nozzle 50 is positioned within vessel chamber 12 and has displaced a portion of sand 22. If nozzle 50 is extended further into vessel chamber 12 as in known in the art, nozzle 50 causes the attached lance body 52 to whip around indiscriminately within vessel chamber 12. Tests of these conventional techniques establish that such techniques shift the configuration of sand 22 without efficiently removing sand 22 from vessel chamber 12. These tests also demonstrate contamination of oil bucket 14 and water discharge 15 due to re-mixing between sand 22, water 24 and oil 26.

Figure 3:
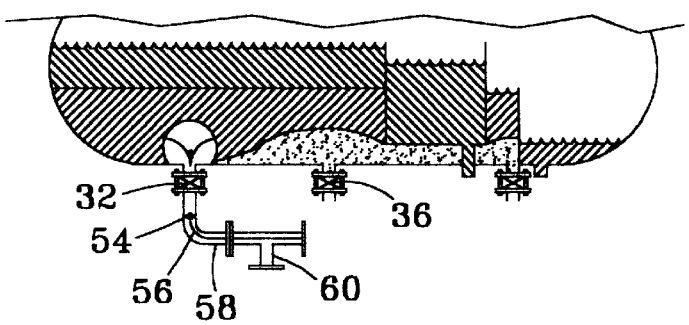
FIG. 3 illustrates placement of a nozzle at an elevation below the vessel interior.

FIG. 3 illustrates one embodiment of the invention illustrating the discovery that sand removal 22 is efficiently accomplished by selective, controlled placement of the fluid discharge through a nozzle. As illustrated, nozzle 54 is attached to lance body 56 installed within conduit 58. Conduit 58 is engaged with valve 32 and is in fluid communication therebetween. T-shaped fitting 60 and seal 61 are connected to conduit 58 to divert sand 22 away from lance body 56. Nozzle 54 is positioned at an elevation below vessel interior chamber 12 and operates to draw sand 22 downwardly through valve 32, into conduit 58, and through fitting 60. Placement of nozzle 54 below the lower surface of vessel interior chamber 12 can be referred to as below surface jetting, and placement of nozzle 54 above 54 the lower surface of vessel interior chamber 12 can be referred to as above surface jetting. It will be appreciated by one skilled in the art that nozzle 54 can be positioned slightly above the lower surface of vessel interior chamber 12, with the nozzle pointed downwardly to draw sand 22 downwardly toward valve 32 without significant agitation of sand 22 above nozzle 22.

Figure 4:
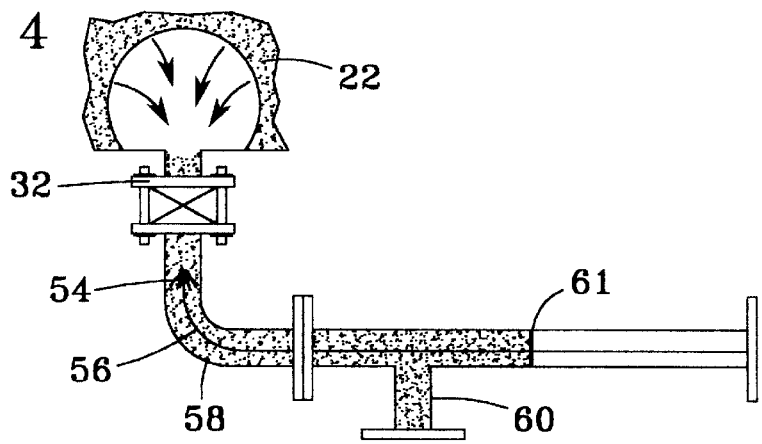
FIG. 4 illustrates the operation of a nozzle operated to draw the sand downwardly through a valve.

In a preferred embodiment of the invention, nozzle 54 generates a cavitational pull which draws sand 22 downwardly through valve 32 as shown in FIG. 4. Such flow can be vortical, laminar, or can comprise a more complicated fluid dynamics sufficient to cavitate sand 22 without excessive agitation which would disperse sand 22 upwardly into water 24 and oil 26. As used herein, the term "vortical" refers to any flow mechanism sufficient to cavitate sand 22 without excessively agitating sand 22 above nozzle 22 so that sand 22 is dispersed throughout water 24 and oil 26. As sand 22 gravitates downwardly through valve 32, sloped sides are formed in sand 22 as a quantity of sand 22 is cavitated or removed from vessel interior chamber 12 without mixing sand 22 with water 24 or oil 26. A test was performed in a five foot by twenty foot, three-phase separator vessel 10 having a simulated sand condition for the solid material 22. A slurry of water 24, oil 26 and sand 22 was pumped into the test vessel 10 resulting in the sand 22 distribution illustrated in FIG. 1. A total quantity of 175 gallons of sand 22 were positioned within vessel interior chamber 12. Valve 32 was opened to permit the withdrawal of sand 22 through nozzle 54 positioned below vessel interior chamber 12, and 46 gallons of sand 22 were retrieved in forty-five minutes at a pump rate of 70 gallons per minute (GPM). No sand was observed in oil bucket 14 or water discharge 16.

Figure 5:
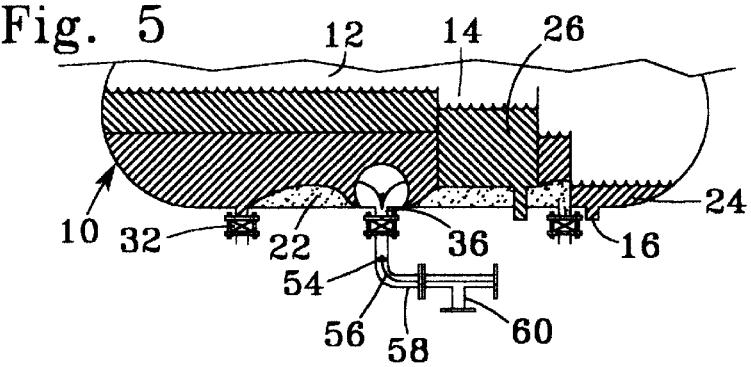
FIG. 5 illustrates the nozzle after the nozzle has been moved to another port.

In a variation of the invention, valve 32 can be closed and conduit 58 can be disengaged from valve 32, and conduit 58 can be moved to engagement with valve 36 for further operation as shown in FIG. 5. Valve 36 can be opened, nozzle 54 can be operated to discharge a pressurized fluid stream below vessel interior chamber 12, and sand 22 cavitates within interior chamber 12 as shown in FIG. 5. A test was performed over forty-five minutes at a pump rate of 70 GPM. Forty gallons of sand 22 were withdrawn, for a cumulative total of 86 gallons of sand 22. No sand was observed in oil bucket 14 or in water discharge 16.

The process of operating nozzle 54 at an elevation below vessel interior chamber 12 to draw sand 22 downwardly significantly reduces stirring and mixing of sand 22 with water 24 or oil 26. This feature of the invention sufficiently reduces the sand 22 quantity within vessel 10 on an in-service basis and permits continuous operation of separation vessel 10. Another embodiment of the invention facilitates the removal of additional sand from vessel 10.

Figure 6:
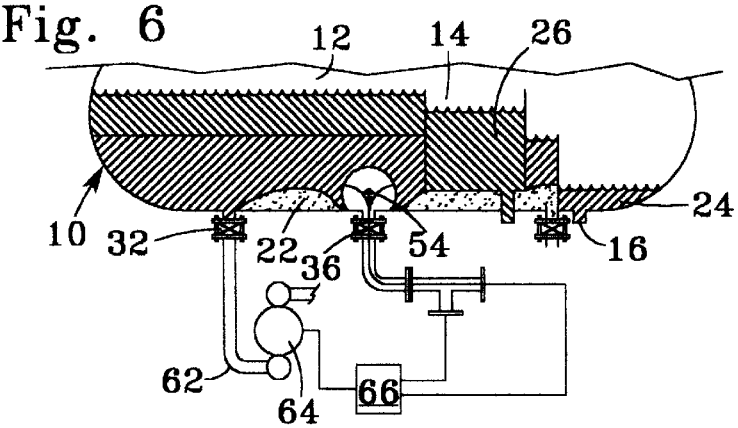
FIG. 6 illustrates a nozzle raised into the vessel interior to sweep sand toward another discharge port.

As shown in FIG. 6, nozzle 54 can be moved into vessel interior chamber 12 after the initial quantity of sand 22 is removed from contact with valves 32 and 34. Conduit 62 can be attached between pump 64 and valve 32, and valve 32 can be opened to withdraw sand 22 from vessel interior chamber 12 as nozzle 54 discharges a pressurized fluid stream to dislodge sand 22. FIG. 6 illustrates how this combination operates to dislodge sand 22 from vessel interior chamber 12 without significantly disturbing water 24 or oil 26, and without contaminating oil bucket 14 and water discharge 16. The invention accomplishes this result by controlling discharge placement of the pressurized fluid stream exiting nozzle 54. Instead of randomly manipulating nozzle, and instead of permitting nozzle to whip uncontrollably through vessel interior chamber 12, precise and controlled dislodgement of sand 22 can be accomplished. Nozzle 54 can be manipulated virtually 360 degrees about a central pivot point, and can be rotated about such axis to provide additional movement. A test of this method over forty-five minutes at a pump rate of 70 GPM retrieved 25 gallons of sand 22, for a cumulative total of 111 gallons.

Operation of nozzle 54 can be performed and monitored by a control means such as controller 66. Controller 66 monitors placement and flow quantity of the pressurized fluid stream discharged through nozzle 54, and can be further connected to conduit 58 or to conduit 62 to monitor the rate of sand 22 flow from vessel 10. By monitoring the flow rate and discharge quantity of sand 22, controller 66 monitors the effectiveness of sand 22 removal for a particular orientation of nozzle 54, and further verifies when the removal of sand 22 has reached a desired result. Controller 66 provides interactive control over cleaning operations, and further provides the ability to display and record the effectiveness of the cleaning operations. Controller 66 can monitor the rate of sand 22 removal, and the quantity of sand 22 removed during operations to estimate the quantity of sand 22 remaining within vessel 10.

Figure 7:
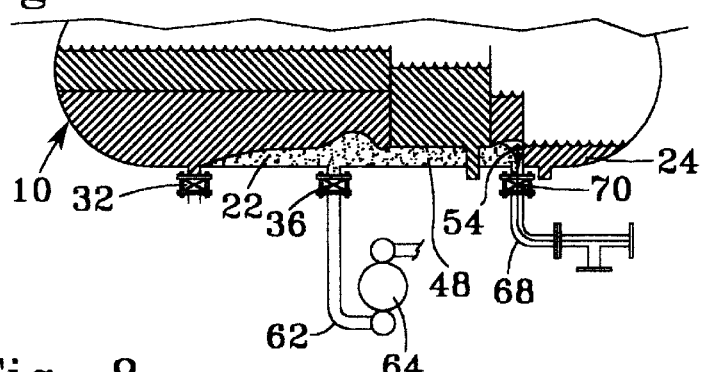
FIG. 7 illustrates one technique for removing sand from below an oil bucket.

In another embodiment of the invention, sand 22 in channel 48 below oil bucket 14 can be removed by using a combination of the techniques described above. Conduit 68 can be attached to valve 70, and nozzle 54 can be positioned below vessel interior chamber 12 to remove sand 22 downwardly through valve 70 as previously described. Nozzle 54 can then be raised into vessel interior chamber 12 as shown in FIG. 7, and pump 64 can be operated to withdraw sand 22 downwardly through valve 36 as illustrated. In a test of this procedure, fifteen gallons of sand were removed during the vortical withdrawal of sand through valve 70, and another fifteen gallons of sand were removed through valve 36 by controlling nozzle 54 discharge within vessel interior chamber 12. Final results of this test completely removed sand 22 from channel 48 under oil bucket 14, and residual sand was evenly distributed throughout the remainder of vessel interior chamber 12. Of the original 175 gallons of sand initially positioned within vessel 10, 140 gallons were recovered for a total recovery efficiency of approximately 80%. As discovered for the previously described tests, this removal of sand 22 was accomplished without sand 22 being released into oil bucket 14 or water discharge 16.

Figure 8:
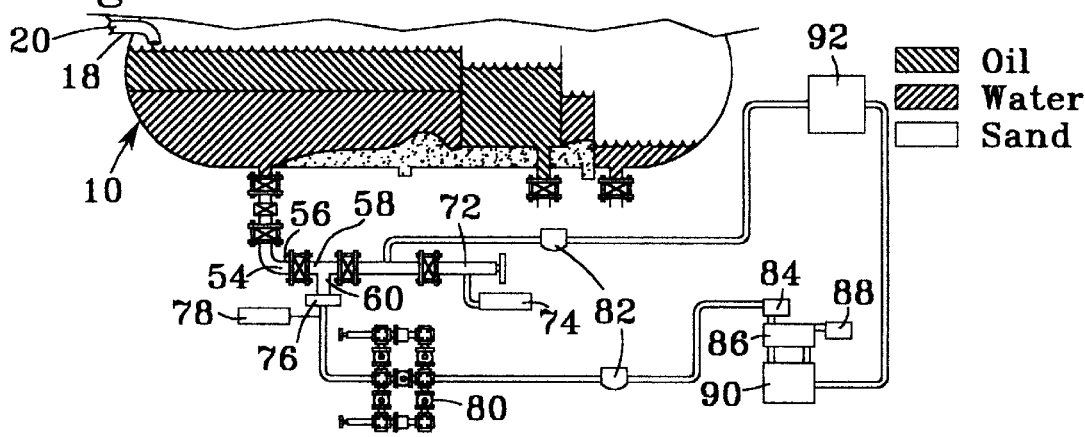
FIG. 8 illustrates a closed loop system incorporating different features of the invention.

FIG. 8 illustrates a closed loop system which embodies different aspects of the invention and which provides for continuous operation of separation vessel 10. Lance body 56 and nozzle 54 are moved through conduit 58 with hydraulic ram 72 energized with power source 74. T-shaped fitting 60 is attached to hydraulic actuated valve 76, which in turn is attached to control means or panel 78. Valve 76 comprises a safety device for shutting off the system and for containing pressure if a problem arises. Control panel 78 can monitor air pressure, hydraulic pressure, sand and fluid flow rates, and can provide a manual override to accommodate mechanical malfunction. Valve 76 is engaged with adjustable choke manifold 80 which permits flow through flow meter 82 and gas breaker 84 before the discharged sand 22 and entrained water 24 is deposited on shaker 86. Gas breaker 84 removes any gas that may have been commingled with sand 22 and water 24, and can divert gas to a flair scrubber or distant discharge (not shown). Choke manifold 80 regulates pressure and flow to the subsequent separation components, and allows flow to divert to either of two individual chokes handling pressures up to 15,000 PSI. Sand 22 is separated to cutting box 88, and the separated water 24 is collected in water tank 90 for recirculation through pump 92 to hydraulic ram 72.

Nozzle 54 can selectively direct a fluid discharge stream of gas, water, recirculated liquids, chemicals such as flocculents, and other compounds. The fluid discharge stream can have a density greater than sand 22, and can comprise a weighted mud or other material. Although solid material 22 is illustrated as a sand agglomerate, solid material 22 can comprise many different materials in loose, hardened or solid form. For materials other than loose aggregates, the addition of chemicals to the fluid discharge stream through nozzle 54 can facilitate the displacement of solid material 22 from vessel 10.

The invention is particularly suited for the removal of sand and other solids from water and hydrocarbon mixtures, however the invention is also useful in other industries and applications. Although the invention is especially useful for in-service cleaning of vessels where production is maintained, the closed loop applications of the invention facilitate safe handling where hazardous materials are contained within a vessel, tank or container.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A method for cleaning unconsolidated solid material from a separating vessel having a hollow interior for continuously receiving a liquid and entrained unconsolidated solid material denser than the liquid wherein the vessel has an aperture for continuously discharging the liquid and further has a valve engaged with the vessel for selectively accessing the vessel interior, said method comprising the steps of:

placing a nozzle in communication with the valve at an elevation below the vessel interior;

opening the valve to place the nozzle in communication with the vessel interior;

discharging a pressurized fluid stream through said nozzle to displace the solid material;

controlling the placement of said pressurized fluid stream as the pressurized fluid stream is discharged through said nozzle; and withdrawing solid material from the vessel interior through said valve.

2. A method as recited in claim 1, wherein said nozzle is positioned within the vessel interior and is oriented so that the pressurized fluid is directed downward through said valve, as the pressurized fluid stream is discharged through said nozzle, to withdraw the solid material through said valve.

3. A method as recited in claim 2, further comprising the step of operating a control means to control the placement of said pressurized fluid stream through said nozzle.

4. A method for cleaning unconsolidated solid material from a separating vessel having a hollow interior for continuously receiving a liquid and entrained unconsolidated solid material denser than the liquid, wherein the vessel has an aperture for continuously discharging the liquid and further has a valve engaged with the vessel for selectively accessing the vessel interior, said method comprising the steps of:

placing a nozzle in communication with the valve, wherein the valve is in the bottom of the vessel;

opening the valve to place the nozzle in communication with the vessel interior;

operating a control means to control the displacement of said pressurized fluid stream through said nozzle to displace the solid material;

operating said control means to monitor the exit rate of solid material through said valve;

controlling the placement of said pressurized fluid stream by selectively moving said nozzle to control the placement of said pressurized stream;

withdrawing solid material from the vessel interior through said valve.

5. A method for cleaning unconsolidated solid material from a separating vessel having a hollow interior for continuously receiving a liquid and entrained unconsolidated solid material denser than the liquid, wherein the vessel has an aperture for continuously discharging the liquid and further has a valve engaged with the vessel for selectively accessing the vessel interior, said method comprising the steps of:

placing a nozzle in communication with the valve, wherein the valve is in the bottom of the vessel;

opening the valve to place the nozzle in communication with the vessel interior;

discharging a pressurized fluid stream through said nozzle to displace the solid material;

controlling the placement of said pressurized fluid stream to generate a vortical flow for drawing solid material through said valve; and withdrawing solid material from the vessel interior through said valve.

\* \* \* \* \*